US008359430B1

(12) United States Patent
Fair

(10) Patent No.: US 8,359,430 B1

(45) Date of Patent: Jan. 22, 2013

(54) TECHNIQUES FOR EFFICIENT MASS STORAGE LAYOUT OPTIMIZATION

(75) Inventor: Robert L. Fair, Gary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 586 days.

(21) Appl. No.: 11/848,101

(22) Filed: Aug. 30, 2007

(51) Int. Cl.
*G06F 12/08* (2006.01)

(52) U.S. Cl. ........ 711/113; 711/135; 711/137; 711/165; 711/E12.019; 711/E12.057

(58) Field of Classification Search .................. 711/165
See application file for complete search history.

(56) References Cited

U.S. PATENT DOCUMENTS

| | | | | |
|---|---|---|---|---|
| 5,890,205 | A * | 3/1999 | Grimsrud et al. | 711/112 |
| 2004/0030839 | A1 * | 2/2004 | Southwell et al. | 711/137 |
| 2004/0088504 | A1 * | 5/2004 | Hsu et al. | 711/158 |
| 2005/0021900 | A1 * | 1/2005 | Okuyama et al. | 711/4 |
| 2005/0165856 | A1 * | 7/2005 | Fellenstein et al. | 707/200 |
| 2005/0187985 | A1 * | 8/2005 | Edwards et al. | 707/200 |
| 2005/0216665 | A1 * | 9/2005 | Takakuwa | 711/114 |
| 2005/0262384 | A1 * | 11/2005 | Andoh et al. | 714/5 |
| 2007/0198614 | A1 * | 8/2007 | Zhang et al. | 707/205 |
| 2008/0010395 | A1 * | 1/2008 | Mylly et al. | 711/100 |
| 2009/0055450 | A1 * | 2/2009 | Biller | 707/205 |

OTHER PUBLICATIONS

Windsor W. Hsu. "Dynamic Locality Improvement Techniques for Increasing Effective Storage Performance." Jan. 2003. EECS, University of California, Berkeley. Tech Report No. UCB/CSD-03-1223.*

Chye Lin Chee, Hongjun Lu, Hong Tang, and C.V. Ramamoorthy. "Adaptive Prefetching and Storage Reorganization in a Log-Structured Storage System." 1998. IEEE. IEEE Transactions of Knowledge and Data Engineering. vol. 10. No. 5. pp. 824-838.*

Amit Singh. Mac OS X Internals: A Systems Approach. Jun. 2006. Addison-Wesley Professional. pp. 1045-1047.*

Windsor W. Hsu, Alan Jay Smith, and Honesty C. Young. "The Automatic Improvement of Locality in Storage Systems." Nov. 2005. ACM. ACM Transactions on Computer Systems. vol. 23. No. 4. pp. 424-473.*

David A. Patterson and John L. Hennessy. Computer Organization and Design: The Hardware/Software Interface. 1998. Morgan Kaufmann Publishers. p. 589.*

Sam S. Stone et al. "Address-Indexed Memory Disambiguation and Store-to-Load Forwarding." Nov. 2005. IEEE. MICRO '05.*

* cited by examiner

*Primary Examiner* — Nathan N Sadler

(74) *Attorney, Agent, or Firm* — Blakely, Sokoloff, Taylor & Zafman LLP

(57) ABSTRACT

A data storage system can automatically improve the layout of data blocks on a mass storage subsystem by collecting optimization information during both read and write activities, then processing the optimization information to limit the impact of optimization activities on the system's response to client requests. Processing read-path optimization information and write-path optimization information through shared rate-limiting logic simplifies system administration and promotes phased implementation, which can reduce the difficulty of developing a self-optimizing storage server.

22 Claims, 10 Drawing Sheets

Data Received from Client 500
Data Stored in Buffer Cache 510
Cache Buffer Marked Dirty 520
Identify Write Extent 530
Post Requests to Read Write-Extent Blocks 540
Mark Write-Extent Blocks "Fake-Dirty" 550
Begin Cache Flush 560
All Write-Extent Blocks Present ? 570
Yes
No
Write "Dirty" and "Fake Dirty" Blocks 580
Write "Dirty" Blocks Only 590
Done 3
350
Writing
310
370
Internal Operations
398
380
330
Filesystem Processing
395
Buffer Cache
Input/Output
Client Interaction
360
392
300
320
Reading
340

TECHNIQUES FOR EFFICIENT MASS STORAGE LAYOUT OPTIMIZATION

FIELD

The invention relates to data storage operations. More specifically, the invention relates to low-computational-cost methods for improving the layout (e.g. reducing fragmentation or leveling wear) in objects stored on a mass storage device.

BACKGROUND

Many contemporary data processing systems consume and/or produce vast quantities of data. Electromechanical devices such as hard disk drives are often used to store this data during processing or for later review. The mechanical nature of many types of mass storage devices limits their speed to a fraction of the system's potential processing speed, so measures must be taken to ameliorate the effects of slow storage.

Mass storage devices are commonly viewed as providing a series of addressable locations in which data can be stored. Some devices (such as tape drives) permit storage locations to be accessed in sequential order, while other devices (such as hard disks) permit random access. Each addressable storage location can usually hold several (or many) data bytes; such a location is often called a "block." Block sizes are frequently powers of two. Common block sizes are 512 bytes, 1,024 bytes and 4,096 bytes, though other sizes may also be encountered. A "mass storage device" may be constructed from a number of individual devices operated together to give the impression of a single device with certain desirable characteristics. For example, a Redundant Array of Independent Disks ("RAID array") may contain two or more hard disks with data spread among them to obtain increased transfer speed, improved fault tolerance or simply increased storage capacity. The placement of data (and calculation and storage of error detection and correction information) on various devices in a RAID array may be managed by hardware and/or software.

Occasionally, the entire capacity of a storage device is dedicated to holding a single data object, but more often a set of interrelated data structures called a "filesystem" is used to divide the storage available between a plurality of data files. Filesystems usually provide a hierarchical directory structure to organize the files on the storage device. The logic and procedures used to maintain a filesystem (including its files and directories) within storage provided by an underlying mass storage device can have a profound effect on data storage operation speed. This, in turn, can affect the speed of processing operations that read and write data in files. Thus, filesystem optimizations can improve overall system performance.

FIG. 2 represents an array of data blocks 2 of a mass storage device. Individual blocks are numbered 200, 201, 202, . . . , 298, 299. Successively-numbered blocks are physically adjacent: the mechanical system used to access the data on the mass storage device does not have to move far to reach adjacent blocks, so the blocks can be accessed relatively quickly (note that the file system may use storage virtualization, such that for any given data block, the block number of that block on disk may not coincide with the block number used by the file system for that block). Three multi-block data objects are indicated with black-filled blocks. Blocks of a multi-block data object can be thought of as logically adjacent: there is a first block containing the first part of the object, followed by a second block containing the second part of the object, and so on; but logically adjacent blocks need not be physically adjacent.

The distinction between logical and physical adjacency is apparent in the first data object, including blocks 203, 217, 244 and 222 (in that order). None of these data blocks is physically adjacent to any of the other blocks, so the data object is said to be fragmented: the system would have to perform a time-consuming seek operation before reading each block to load the data object.

The blocks of the second data object, 271 through 276, are both physically and logically adjacent, so the second data object is unfragmented. All the blocks are contiguous and sequentially stored, so this object could be loaded with only one seek (to reach the beginning of the object).

The third data object, including blocks 281, 282, 284, 285 and 237-239, is partially fragmented. It can be processed relatively quickly by loading blocks 281-285 and discarding unrelated block 283, then seeking to block 237 before loading the final three blocks of the object. Unfragmented or partially fragmented data objects can usually be accessed more quickly than heavily fragmented objects.

Data in fragmented objects can be moved around (blocks relocated on the mass storage device so that they are physically adjacent to logically-adjacent blocks) to reduce fragmentation and improve access speed. Unfortunately, file defragmentation is a time-consuming process, as blocks must be located, read into memory, and then stored in more nearly sequential locations. If the storage device has little free capacity, it may be necessary to move blocks of other objects from place to place to create free areas large enough to hold a defragmented object. Furthermore, files that change or grow tend to become increasingly fragmented over time, necessitating repeated defragmentation operations.

Techniques to reduce fragmentation without explicit, time-consuming defragmentation cycles, may be useful in improving storage operations.

SUMMARY

Embodiments of the invention identify optimizable data blocks during both read and write processing, post read requests to read some of the identified optimizable blocks from a mass storage device, and write some of the blocks read pursuant to the read requests, back to the storage device.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment (nor are they necessarily mutually exclusive), and such references mean "at least one."

DETAILED DESCRIPTION

Figure 1:
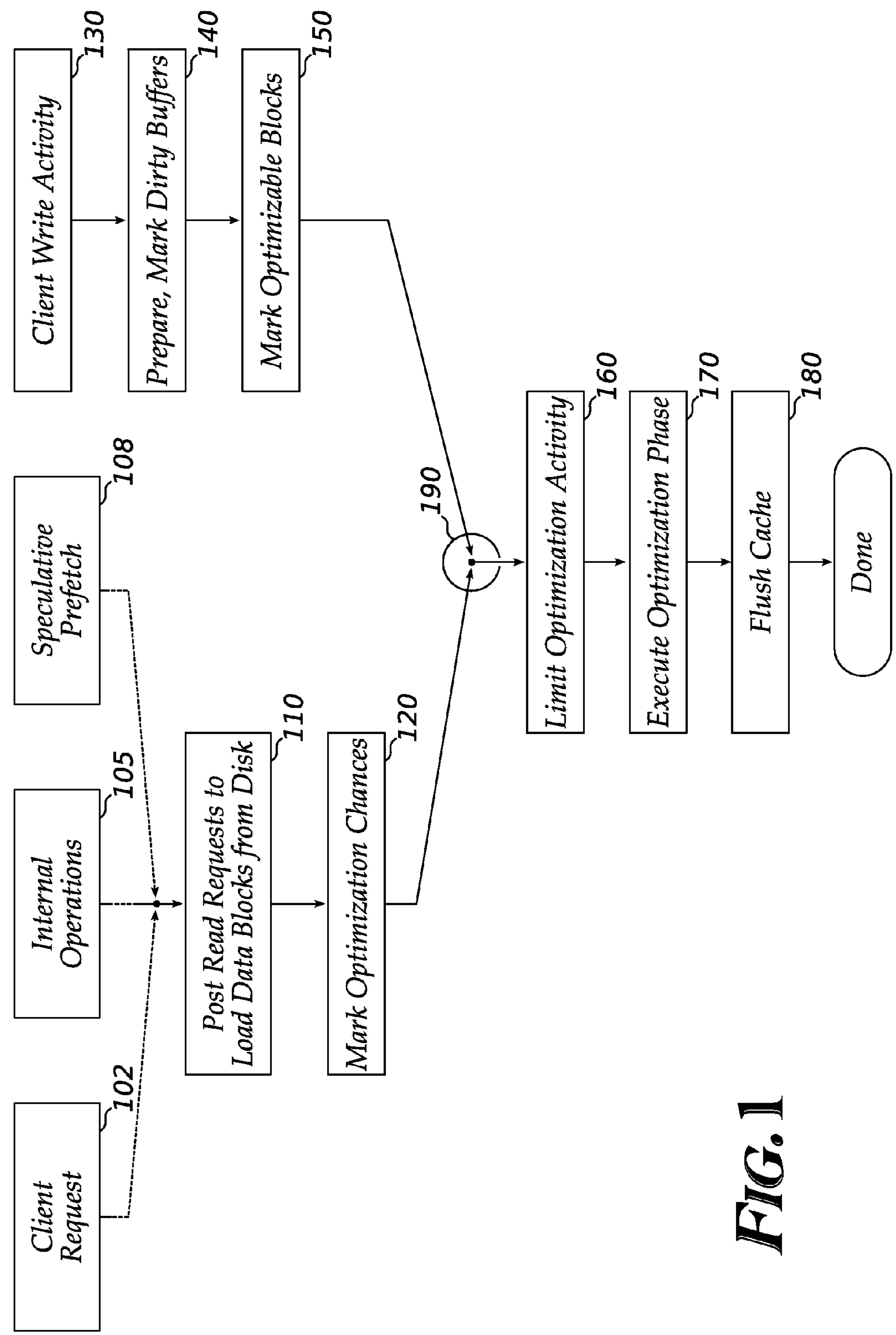
FIG. 1 is a flow chart showing how filesystem layout optimizations from read and write operation streams can be processed by shared or common rate limiting logic.
Figure 2:
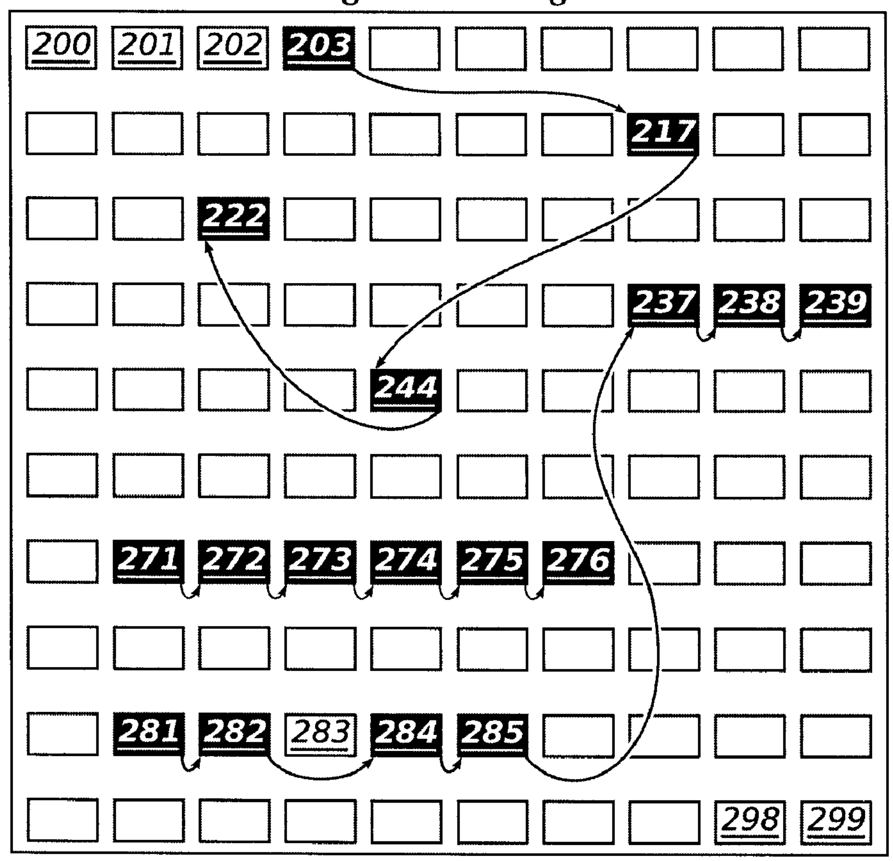
FIG. 2 shows an array of data blocks of a mass storage device, and three data objects of various degrees of fragmentation.

Data layout on a storage device can have a large effect on the performance of the device. As described above, data stored contiguously on a mechanical device such as a disk drive can be accessed faster. Even on devices with no moving parts (such as a Flash memory array or similar solid-state device), data layout is important: sometimes such devices wear out after only a few hundred thousand write cycles, so proper data layout can improve device longevity.

Embodiments of the invention improve the layout of data on a mass storage subsystem such as a disk drive, RAID array, Flash memory or solid-state data storage device. Information collection to plan the layout improvements, and procedures to implement the plans, are integrated seamlessly with other system operations so that filesystem grooming happens automatically, without explicit defragmentation runs. (Systems can still perform explicit defragmentation as well.) Furthermore, the procedures can be subjected to flow controls and rate limiters so that most extra work can be designated as optional: when the system is extremely busy, extra defragmentation work is deferred or cancelled to preserve system resources (e.g., processor cycles, memory, and input/output bandwidth) for serving clients. ("Extra" work is disk reading and writing that the system determines would improve the layout of the disk(s). It is not essential to perform this work, but performance may improve if the extra work is clone.) The result is a system whose storage subsystem performance improves automatically under light or moderate loads, yet can still handle heavy loads effectively (without becoming overwhelmed with "housekeeping" activity).

Embodiments of the invention identify fragmented data objects in a filesystem during both data-reading and data-writing operations. Automatic optimizations are planned to reduce fragmentation, and common rate-limiting logic prevents the planned optimizations from consuming too much of the system's resources. Combining filesystem optimization activities from reading and writing logic paths permits simpler, more accurate control of optimization and reduces software complexity.

By approaching the problem of fragmented filesystems as described here, a common or shared mechanism can be used to deal with fragmentation created or detected during several different filesystem operations. The common (shared) mechanism simplifies software and reduces demands on hardware. It also makes system administration easier. Development of an embodiment can proceed in stages, which presents less risk than a larger, all-or-nothing optimization project. For example, a filesystem optimizer that works on the write path can be implemented, tested and deployed; and later, read-path optimizations can be added that take advantage of the earlier-developed rate-limiting logic. Optimizations discovered during read-path processing can be "injected" into the write-path processing stream, instead of implementing a second rate limiter subsystem to deal with read-path optimizations. Alternatively, read-path optimizations (with rate limiting) may be implemented first, and write-path optimizations addressed afterward.

Figure 3:
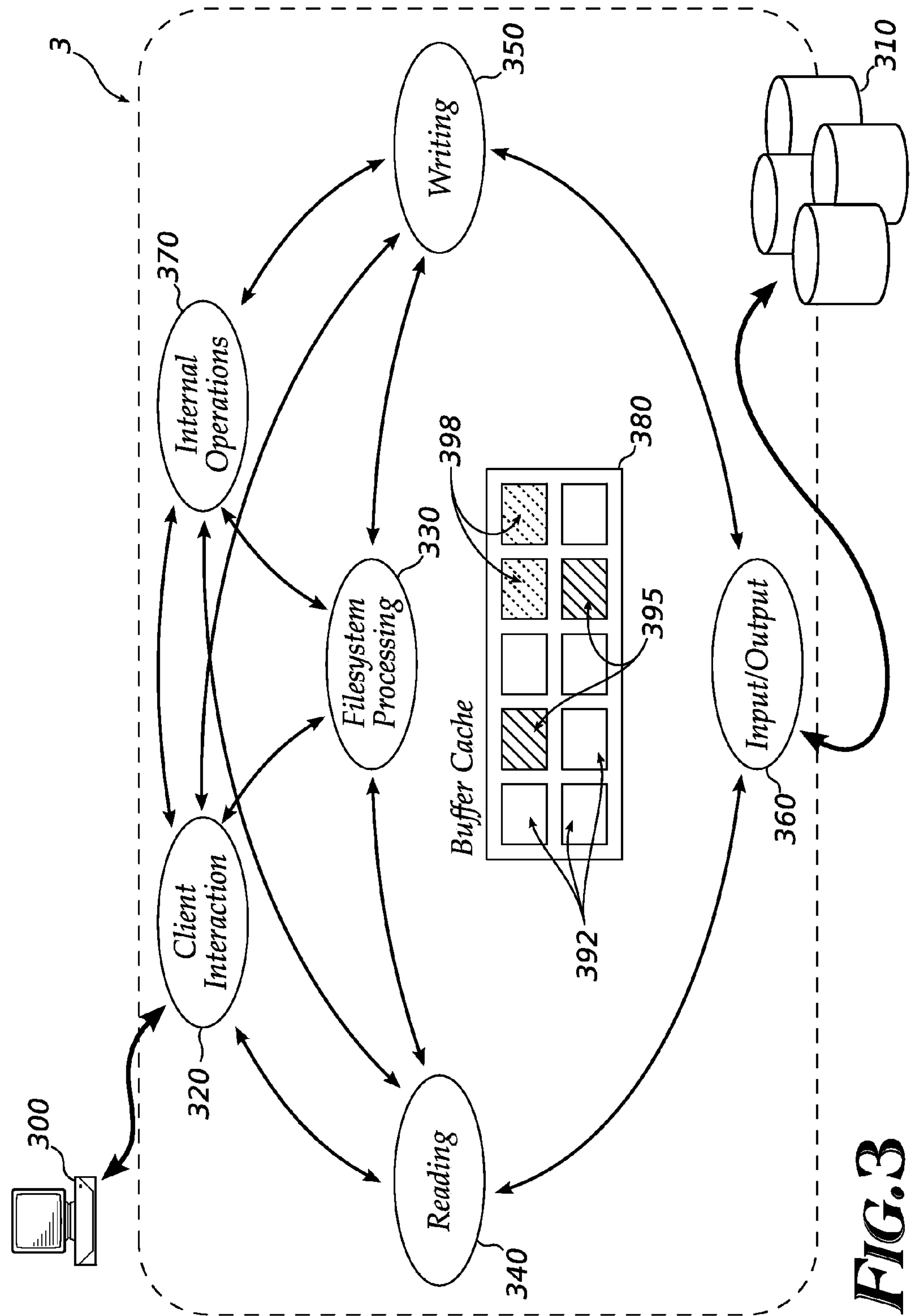
FIG. 3 shows some subsystems and logical modules that interact in a system that implements an embodiment of the invention.

In a modern storage server such as a FAS ("Fabric Attached Storage") system from Network Appliance, Inc. of Sunnyvale, Calif., software and hardware function to coordinate a number of different tasks, with the ultimate goal of providing secure, responsive data storage and retrieval for clients. FIG. 3 shows one way of partitioning the tasks among various logical subsystems of a storage server 3, which cooperate to store data from client 300 on a mass storage subsystem 310. All of these subsystems are shown in a single box in this Figure, but some embodiments may separate some of the subsystems and implement them on separate, cooperating systems.

A client interaction module 320 receives a request from client 300 (such as a request to read or write data), performs the requested operation, and (eventually) returns a response to the client. Requests and responses may be transmitted over a network (not shown) such as a local area network ("LAN"), a wide-area network ("WAN") or a distributed data network like the Internet. Thus, client interaction module 320 may be responsible for network protocol processing, and may pass off processed data storage and retrieval requests to filesystem processing logic 330 to locate requested data or to allocate new mass storage subsystem blocks for a data object. An internal operations module 370 issues requests for data that the storage server 3 needs in the course of its own internal operations. Filesystem processing logic 330 may issue requests to reading logic 340 or writing logic 350, and these requests are ultimately serviced by low-level input/output ("I/O") logic 360, which interacts with the devices in mass storage subsystem 310.

Data blocks read from mass storage subsystem 310 may be placed in buffer cache 380 temporarily, until the subsystem or function that required the data can process it. Similarly, data blocks to be written to mass storage subsystem 310 may be prepared in buffer cache memory, and transferred to the mass storage subsystem by I/O logic 360. Some buffer cache blocks may contain data that is an exact copy of data stored in mass storage subsystem 310. These blocks are called "clean," 392, and may be discarded from the buffer cache if necessary, since the data could be re-loaded from disk. Other blocks 395 contain data that must be (but has not yet been) written to disk (e.g., recently modified data). These blocks are called "dirty." Once dirty blocks are flushed to disk, they may be discarded or simply marked clean. Embodiments of the invention distinguish a third type of block 398 called "fake dirty:" these blocks are already stored on disk, so it is not imperative that they be written (they are already stored somewhere on disk, so no data will be lost if they are not written); but system performance may be expected to improve if the fake-dirty blocks can be written to be physically adjacent to logically related data blocks.

The various subsystems may operate largely independently and asynchronously, notifying each other of tasks to do and results of tasks completed via messages. For example, filesystem processing logic 330 may issue a request to read a data block needed to locate a file within a filesystem, then perform other work until the block's data becomes available. Likewise, when reading logic 340 has succeeded in loading the requested data into buffer cache 380, it may issue an asynchronous completion notification to filesystem processing logic 330, which can then resume its search for the file.

Communications between subsystems may use work queues, messages, flags, or other mechanisms familiar to those of skill in the relevant arts. Embodiments of the invention identify certain conditions that may arise in the operation of a storage server and provide methods for dealing effectively with those conditions. The precise channels through which information flows from subsystem to subsystem are not critical, in general.

FIG. 1 is a flow chart that outlines several sorts of operations that occur within a storage server that implements an embodiment of the invention. As discussed above, these operations do not necessarily have to occur in the exact sequential order shown here. Instead, this flow chart suggests operations that occur earlier and later during the operation of a storage server. Storage server activity may be divided into two basic classes: reading data and writing data. A server may read data stored on its mass storage devices for several different reasons: because a client requests the data (102), because the storage server needs to refer to the data in the course of its own internal operations (105), or because speculative prefetch logic predicts that the data may be needed in the near future (108). Whatever the reason, read requests are posted to cause data blocks to be read from the mass storage device(s) into a buffer cache memory for further processing (110). Location information is computed and used in the reading process, and is also collected for future reference. If blocks that are logically related are stored at several different physical locations across the mass storage device, they may be marked as candidates for layout optimization (120) so that subsequent reads of those data blocks can proceed faster. The "fake-dirty" designation discussed above may be used for that purpose.

In addition, when client-initiated write activity (130) occurs, blocks of data are prepared in buffer cache memory and marked "dirty," (140) indicating that they must be written out to the mass storage device for safekeeping. Here, also, an embodiment may mark additional data blocks as candidates for layout optimization (150) using a "fake-dirty" flag, under circumstances discussed below.

To prevent filesystem optimization activity from consuming too many system resources, optimizations may be limited (160) by one or more different techniques, also discussed below. After any limiting, the surviving optimization activities are executed (170). Finally, at a predetermined interval, when the buffer cache fills to a certain percentage of its capacity, or when some other triggering event occurs, the cache is flushed (180): dirty buffers are stored onto the mass storage device(s). At this time, fake-dirty buffers may also be written out to mass storage to improve subsequent read performance.

Figure 4:
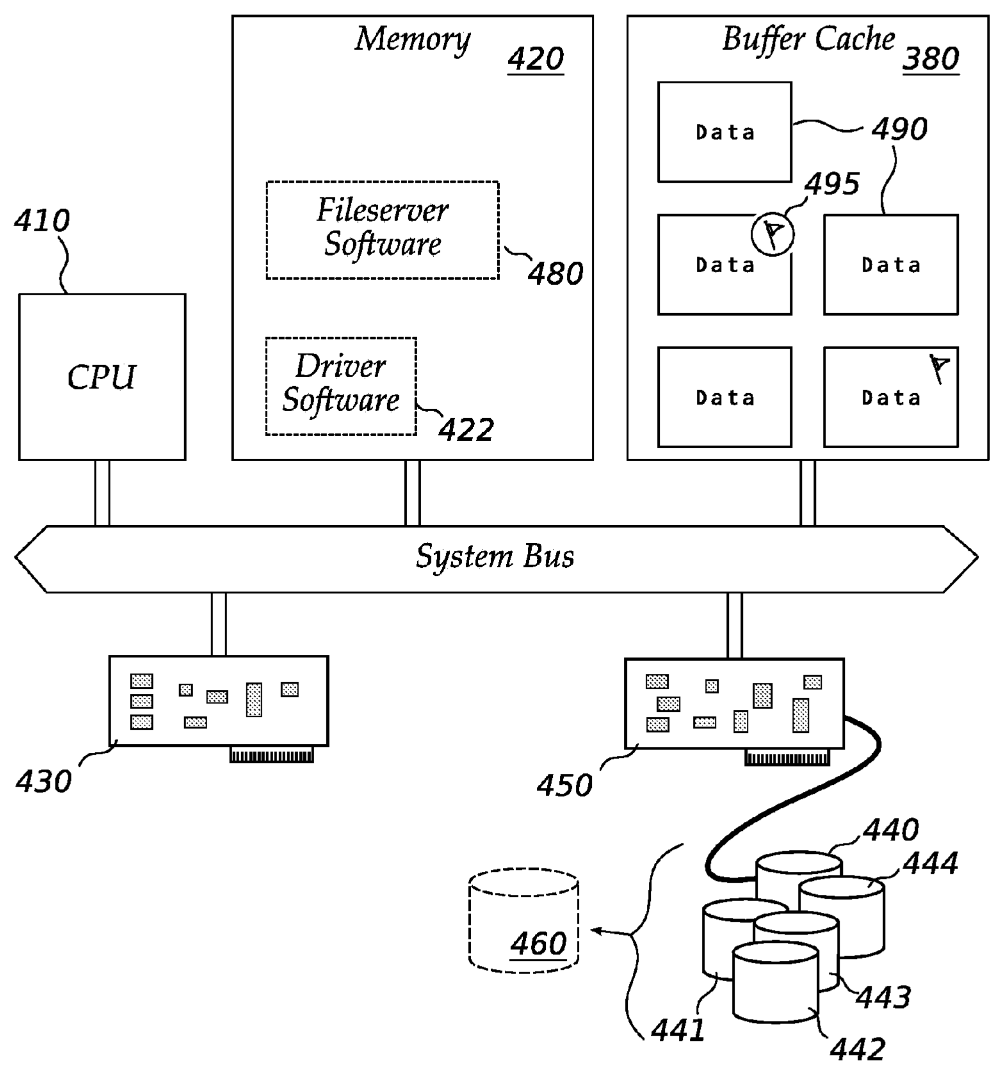
FIG. 4 shows internal components of a system that implements an embodiment of the invention.

As suggested by the merging of the "read" and "write" operations paths at 190, embodiments of the invention are flexible enough to work in both circumstances. Optimization limiting logic 160 may be shared between the read and write operation sequences. Write optimizations will be discussed first. The following examples will refer, when necessary, to the generic storage server depicted in FIG. 4. A programmable processor ("central processing unit" or "CPU") 410 executes instructions stored in memory 420 to perform methods according to embodiments of the invention. A network interface 430 permits the system to exchange commands and data with clients via a local area network ("LAN") or other data network (not shown). The system can read and write data on mass storage devices 440-444 by way of a storage interface 450. Storage interface 450 and low-level driver software 422 may cooperate to present the separate devices 440-444 as a single logical device 460, providing an array of 4,096-byte ("4 KB") data blocks, each identified by an index or "block number." For example, storage devices 440-444 may be operated as a Redundant Array of Independent Disks ("RAID array"). In some embodiments, storage interface 450 can read or write up to 64 consecutive 4 KB blocks of data in a single operation. The minimum size of a storage operation is one block (i.e. partial blocks cannot be written or read.)

The system includes a cache or buffer memory 380, which may be a portion of memory 420 set aside for the purpose, or may be a completely independent memory, as shown here. Data blocks are read from the mass storage devices 440-444 into buffer cache 380 before the data is delivered to a client or internal process that needs it, and 4 KB blocks of data are prepared in buffer cache 380 in advance of writing the data onto the mass storage devices 440-444. Several data blocks in buffer cache 380 are shown as element 490. These blocks may be marked with one or more flags 495 to indicate various conditions that are relevant to operations of an embodiment of the invention. Data blocks in the block cache may have logical relationships to other blocks in the cache (e.g., two blocks may contain successive portions of the same file or data object). Each data block is also associated with a physical location on a mass storage device. Data and instructions ("fileserver software" 480) in memory 420 implement the logical functions described herein.

Figure 5:
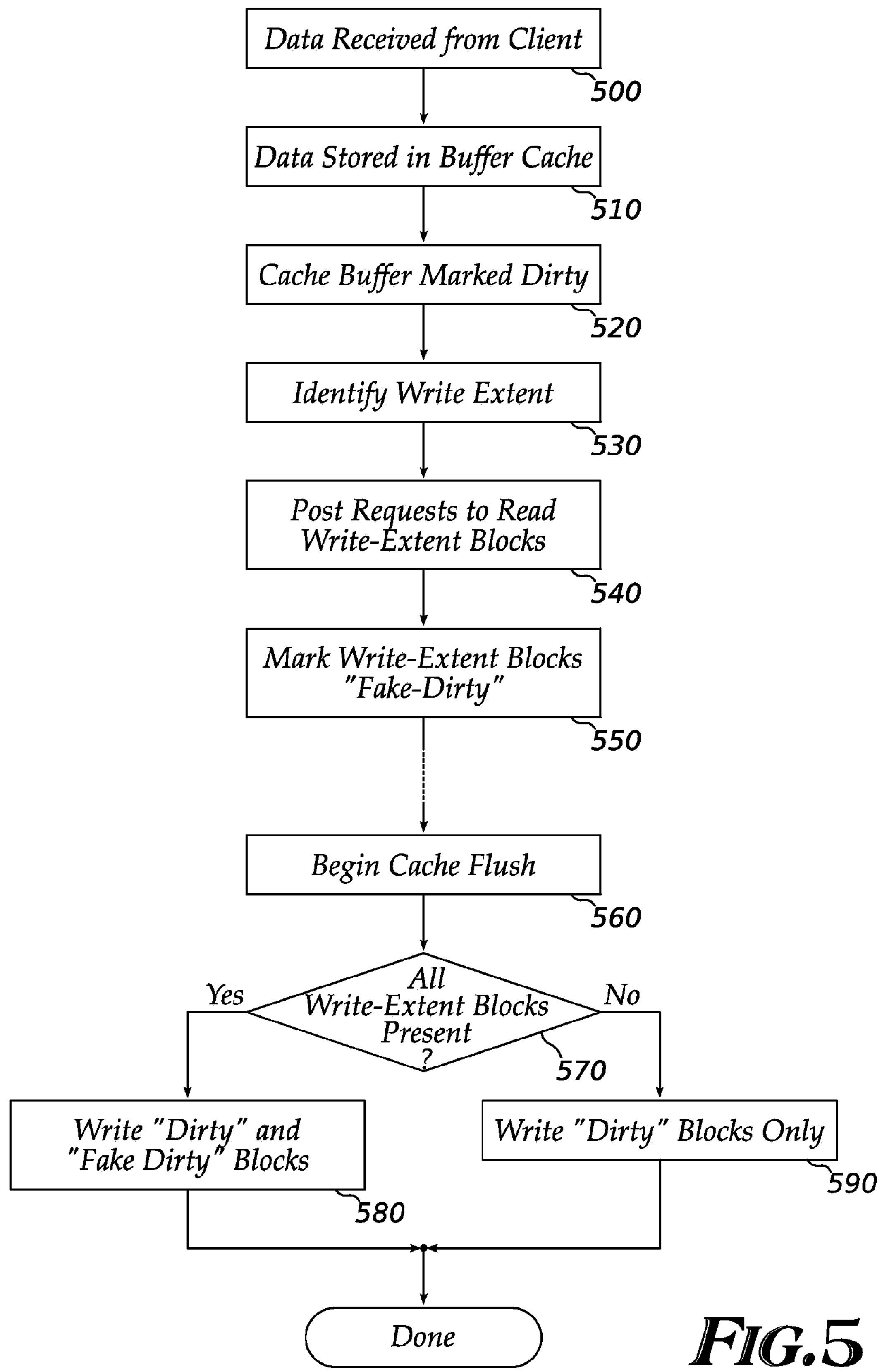
FIG. 5 is a flow chart outlining write-extent operations.

FIG. 5 outlines operations undertaken during writing a data block. The data to be written is received from a client or other source (500), stored in the buffer cache (510), and marked with a "dirty" flag (520) to indicate that it should be written to a mass storage device at the next cache flush. In appropriate circumstances (which depend on the location of the block to be written within its data object, among other factors), a small number of data blocks containing data logically adjacent (preceding or succeeding) the block to be written may be identified as a "write extent," (530), and read requests posted to load those blocks into cache memory (540). For example, if a write extent is four blocks, then a request to write block 45 might trigger read requests to load blocks 44, 46 and 47 into cache so that all four blocks can be written out together to a contiguous portion of the mass storage device. As data from write-extent blocks arrives (asynchronously, as discussed above) in the buffer cache, the buffers are marked to be written out with the other blocks in the extent (550) (e.g., using a "fake-dirty" flag and other information).

Later, when the next cache flush cycle occurs (560), if all the blocks of the write extent are present the buffer cache (570), they are written out together to a contiguous portion of the mass storage device (580). If all the blocks are not present, only the "dirty" block is written out (590).

Write extents can improve the performance of subsequent sequential reads of the data by reducing disk seeks by up to $$\frac{n-1}{n},$$

where n is the number of blocks in a write extent (i.e., 75% for four-block extents). They are especially effective for workloads that are patterned as many random writes followed by a single sequential read, because each random write ends up bringing n logical blocks together physically, where they can be read quickly. One important client application that exhibits this random-writes-followed-by-sequential-read behavior is Exchange Server by Microsoft Corporation of Redmond, Wash.

The read requests posted to load write-extent blocks, and the blocks thus loaded, bear flags to indicate that they are part of a filesystem optimization attempt. These flags, and the processing they trigger, will be discussed further in connection with throttling optimization activity.

Figure 6:
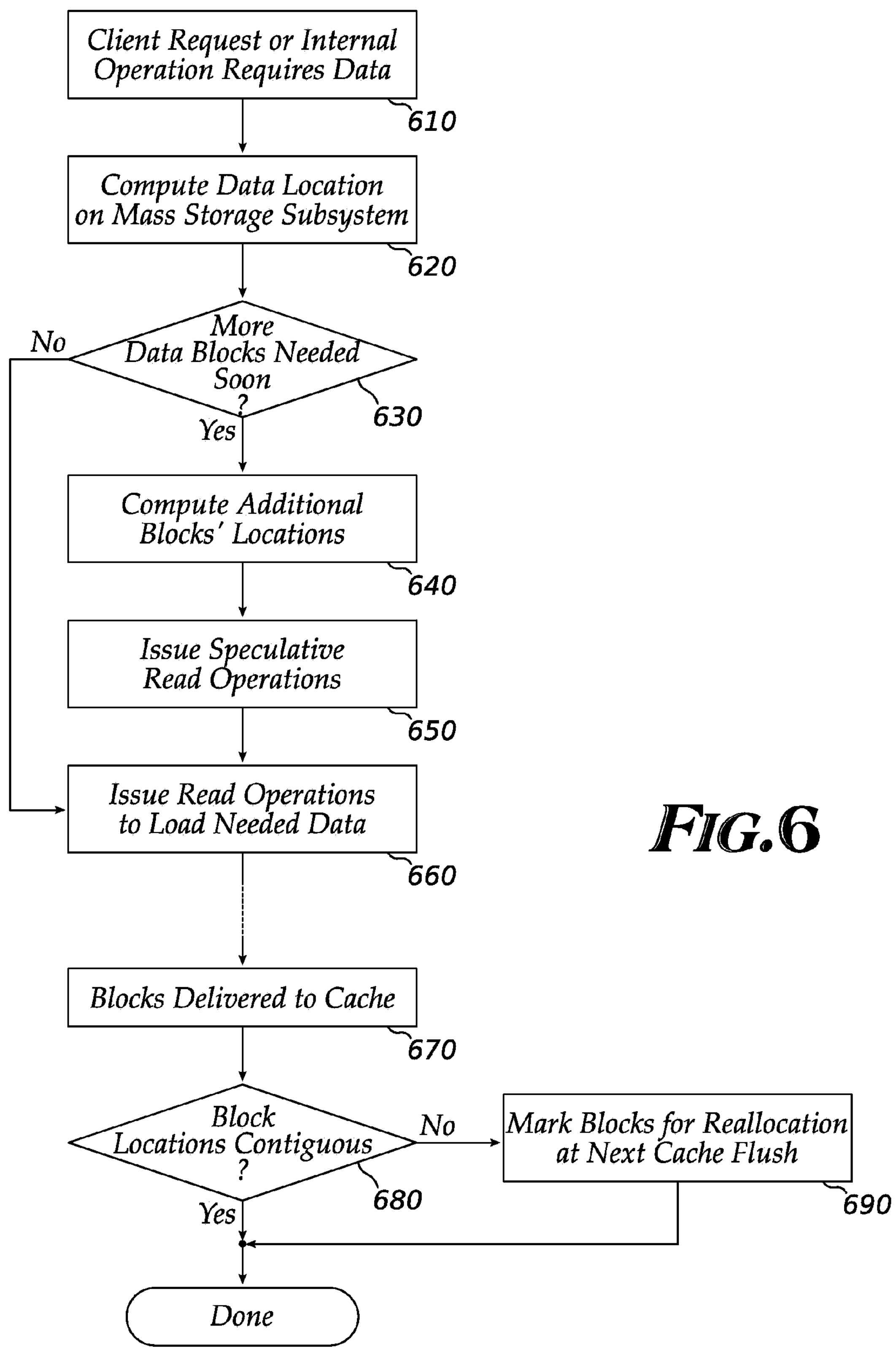
FIG. 6 is a flow chart outlining speculative read-ahead operations.

FIG. 6 outlines read operations in a storage server that implements an embodiment of the invention. A client request or internal storage server operation may call for data to be read from a mass storage device (610). The location of the block(s) containing the desired data is computed (620) by filesystem logic that interprets file and directory pointers, block maps and other information. Speculative read-ahead logic in the storage server may determine that additional data blocks are likely to be required soon (630), and the locations of these blocks are computed as well (640). Read operations are posted to obtain the speculative read-ahead data blocks (650), along with read operations to obtain the required/requested data (660). The read operations for speculative data are marked with flags to indicate that they are speculative (i.e., no client or process yet requires the data contained in the blocks, but it is expected to be useful in the future).

As the read operations complete, stored data blocks are delivered into buffers in cache memory (670). If a buffer's data block was not physically contiguous with its logical predecessor or successor (680), it may be marked for relocation at the next cache flush (690) (again, with a "fake-dirty" flag and other information). Buffers marked for relocation may be written out together to a contiguous portion of the mass storage device, which may improve performance of subsequent sequential reads of the relocated data. As mentioned earlier, read posting and data buffer delivery may occur asynchronously, though this is difficult to represent in the strict linear form of an ordinary flow chart. It should be appreciated that, for example, operation 680, checking for block contiguity, may occur earlier than shown—perhaps as early as operation 620 or 640, when block locations are computed. Alternatively, block contiguity checking 680 and reallocation marking 690 may occur as blocks are delivered to cache (670), instead of after delivery, as FIG. 6 shows. In general, embodiments may improve performance by executing various operations as soon as other predicate information is available—for example, marking blocks that will be read for reallocation as soon as their locations are determined to be non-contiguous, rather than waiting until the blocks' data is actually retrieved from mass storage.

Figure 7:
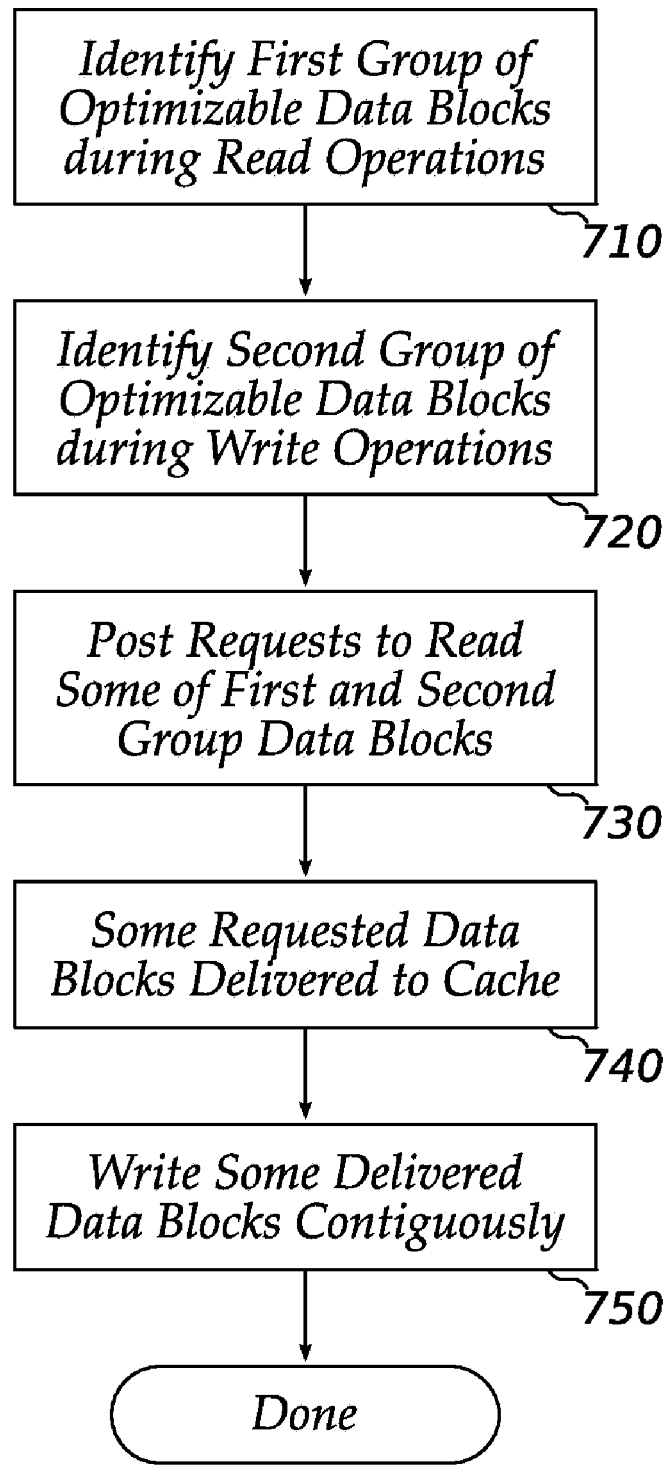
FIG. 7 is a flow chart outlining processing of optimization opportunities discovered by reading and writing processes.

Returning from these separate descriptions of storage server read and write paths to a broader view of embodiments of the invention, FIG. 7 is a flow chart outlining overall operations. A first group of optimizable data blocks is identified during a read process (710). For example, speculative prefetch logic operations may yield information about a fragmented data object whose physical block layout could be improved, so some blocks of the fragmented object may be added to the first group. A second group of optimizable data blocks is identified during a write process (720). For example, write extents logic may designate unmodified data blocks logically adjacent to (or near) a modified data block for re-writing with the modified block, and add those blocks to the second group. Read requests are posted to load some of the first and second groups of data blocks (730). A first mechanism to limit optimization activity load may operate here: the system may provide a restricted or fixed-size pool of read requests to load optimization-related data blocks. If no more requests can be added to the pool, then those optimization chances are foregone. Therefore, the read requests posted in operation 730 may be a subset of the blocks identified in operations 710 and 720. If the fixed-size pool is large enough, however, the "subset" may include all of the blocks.

As the system continues to operate, some of the requested data blocks are delivered into buffer cache memory (740). These blocks may be marked with various flags to indicate that they are part of optimization activity. Later (possibly before all the read requests are fulfilled), some of the data blocks are written out to contiguous physical locations of the mass storage subsystem (750). Writing the data blocks to contiguous physical locations may reduce the fragmentation of the data object(s) that include those data blocks. Again, it is possible that not all of the blocks requested in operation 730 will be delivered in time for the write operations 750. Thus, the blocks written may be a subset of the blocks for which read requests were posted.

Figure 8:
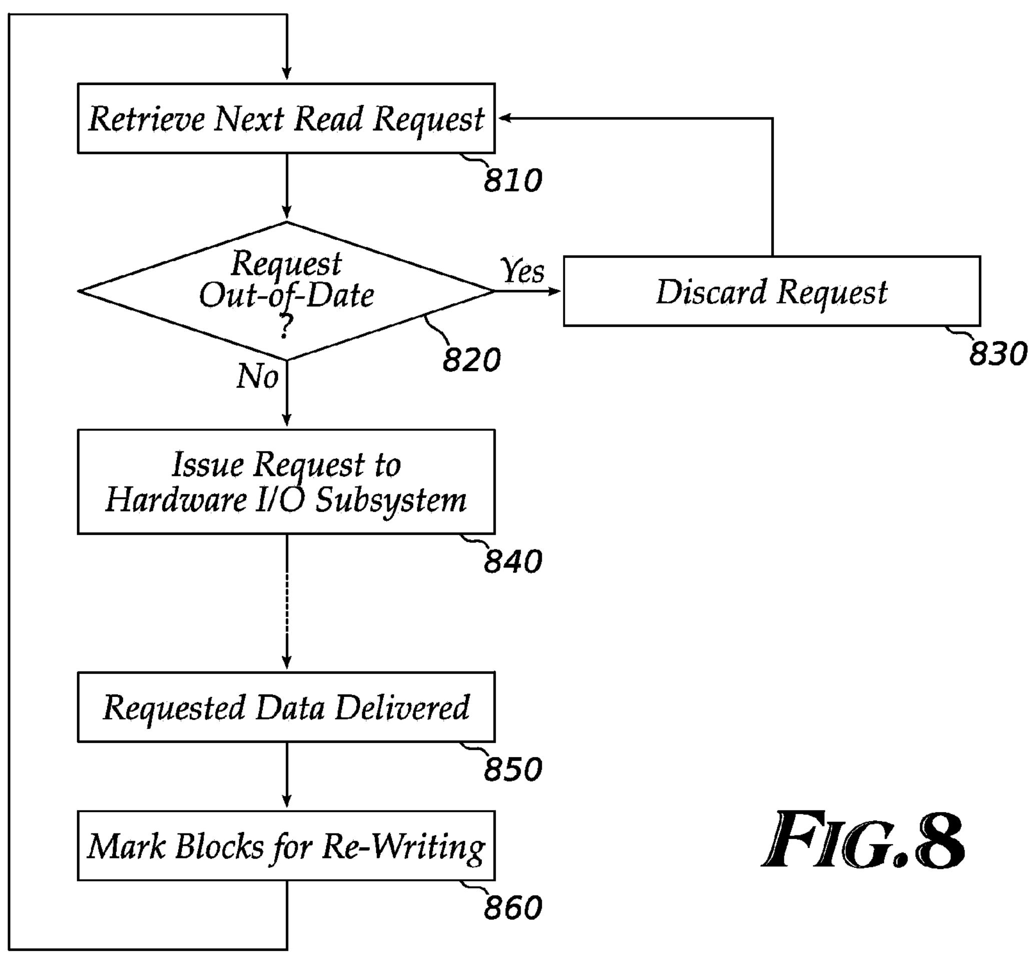
FIG. 8 is a flow chart presenting read operations from another perspective.

FIG. 8 shows operations of an embodiment of the invention performed by a logic module that reads data blocks from a mass storage subsystem, delivers the data to buffer cache, and notifies a requestor that the data is available through an inter-thread communication message, callback, or similar mechanism. This logic module processes requests retrieved from a pool or queue, where they have been placed by other processes that need the data.

The reading logic module retrieves the next request from the pool or queue (810) and checks a timestamp-like element of the request. If the request is out-of-date (820), it is discarded (830). (An out-of-date request may be one that is to load data for a write extent, when the extent's dirty block has already been flushed to disk.)

If the request is still valid, it is issued to an underlying hardware input/output ("I/O") system (840), to transfer the block's data from mass storage to the buffer cache. The requested data is delivered (850), and the buffer is marked for re-writing (860). The markings may indicate, for example, that the block is fake-dirty, that it is part of a write extent, or that it is part of a read-reallocation optimization.

The write-extent operations described with reference to FIG. 5, and the speculative read-reallocation operations described with reference to FIG. 6, issue extra read requests and cause additional data blocks to be loaded into buffer memory. The read requests and loaded data blocks from the two different processes can be treated largely alike, as was alluded to in the description of FIG. 1. Read requests from both processes may be serviced on a "best effort" basis, since no client or internal process actually requires the data to continue. ("Best effort" means that the request will be serviced if time and resources permit, but requests that could not be serviced may be discarded instead of being preserved and retried later.) Loaded data blocks may also be written out to contiguous locations on a "best effort" basis, since most of the data is already saved on the mass storage subsystem (albeit possibly in a suboptimal location). Therefore, a shared logic path may be used to limit the server resources (e.g., input/output ("I/O") bandwidth and processing cycles) devoted to carrying out write-extent and read-reallocation processing.

Controlling server resources used for filesystem grooming is important because the extra read and write requests issued to the mass storage subsystem might overload a busy storage server with background work. This is especially important when the storage server is used as a data repository for Microsoft Exchange Server, since that application is sensitive to latency—small delays in storing or retrieving data may cause moderate-to-severe degradation in the response seen by end users.

Figure 9:
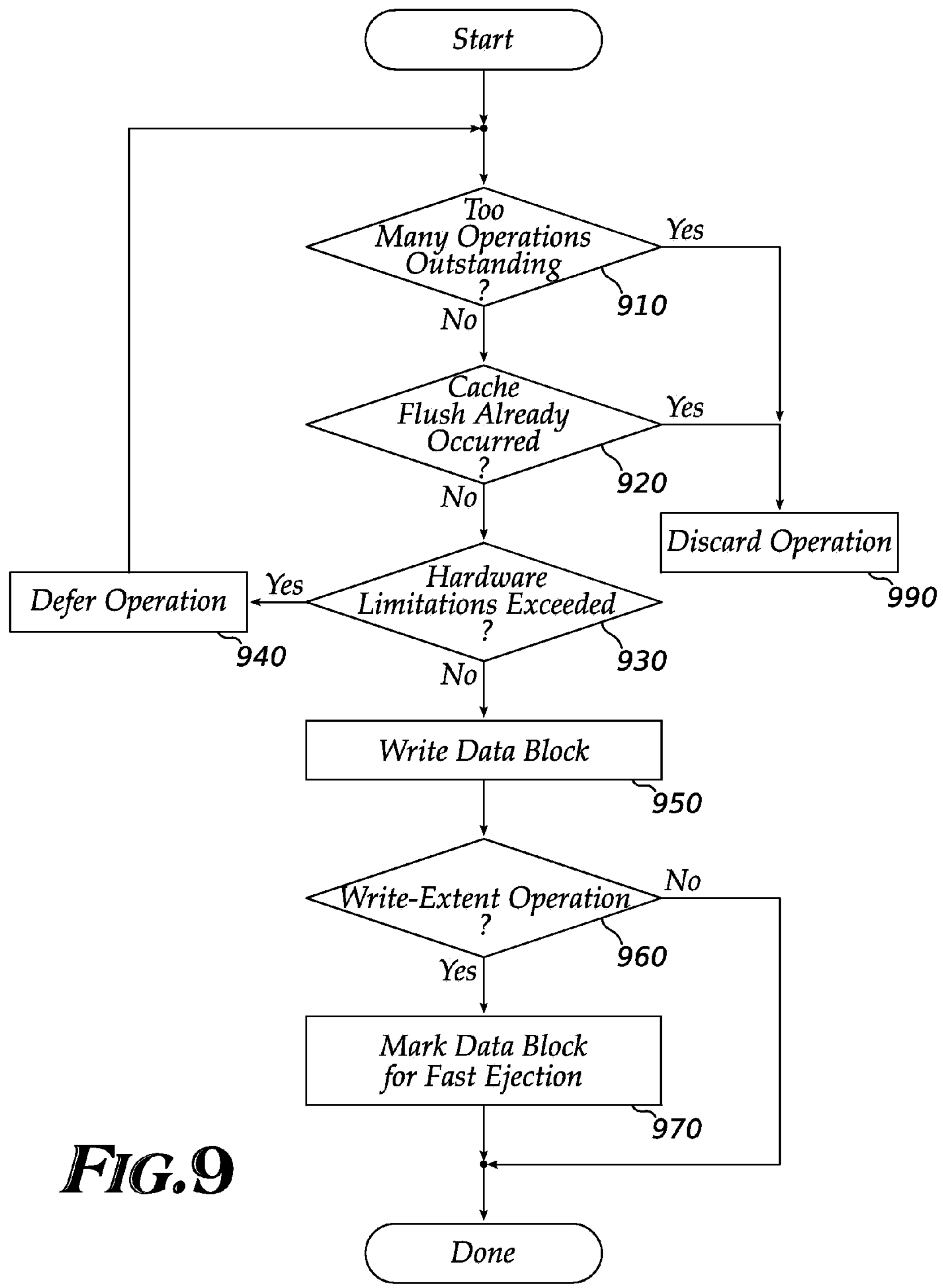
FIG. 9 is a flow chart outlining a load-limiting method.

FIG. 9 outlines the common rate-limiting control logic, which acts as a "funnel" or "faucet" to control the overall filesystem grooming workload, regardless of whether the optimization tasks originated from write extents or read reallocation. If a read request that originated from write extents or read reallocation would cause the number of outstanding requests to exceed a configurable maximum (910), the request is discarded (990). If the request is old (i.e., it pertains to a cache flush that has already occurred) (920), the request is discarded (990). If the request would exceed a hardware limit such as a RAID I/O limit (the permissible number of concurrently-outstanding I/O operations) (930), it is deferred (940), for example until other pending requests complete, then it may be retried. Other tests may also be performed to help avoid overloading the system with read-reallocation and write-extents-related disk write activity.

If the rate-limiting tests allow, the data block is written (950). The write operation places the block near (preferably contiguously with) related data blocks. If the block written was part of a write-extent operation (960), the copy of the block in buffer cache (now marked clean) may also be marked for rapid ejection from the cache (970). If, on the other hand, the block was read as part of a speculative prefetch operation, and written as part of a read-reallocation optimization, it may be allowed to linger in the buffer cache because of the system's prediction that the data will be useful soon. Rapid-ejection marking modifies a more common first-in, first-out ("FIFO") or least-recently-used ("LRU") cache function, where data newly arriving in the cache may displace the oldest data in the cache, or the data that has been unused longest. This is because write-extent fake-dirty data may not be useful except for the limited purpose of writing together with a modified data block. Therefore, ejecting this data quickly can help relieve cache resource pressure.

Embodiments of the invention may be especially beneficial when used in connection with Copy-on-Write ("CoW") filesystems. A CoW filesystem can maintain exact copies of data objects with very little disk usage, because identical blocks are shared between the objects. When a block of an object is modified, a copy of the shared block is made, and only the copy is modified. CoW filesystems can preserve historical versions of data objects for future reference, and CoW techniques are useful for reducing data storage requirements in relational database systems. Unfortunately, data objects stored in CoW filesystems tend to become heavily fragmented, as write operations replace a shared data block within a sequence with an un-shared block located elsewhere. However, by using write extents and read-reallocation techniques of embodiments of the invention, fragmentation can be automatically reduced in a CoW filesystem.

Figure 10:
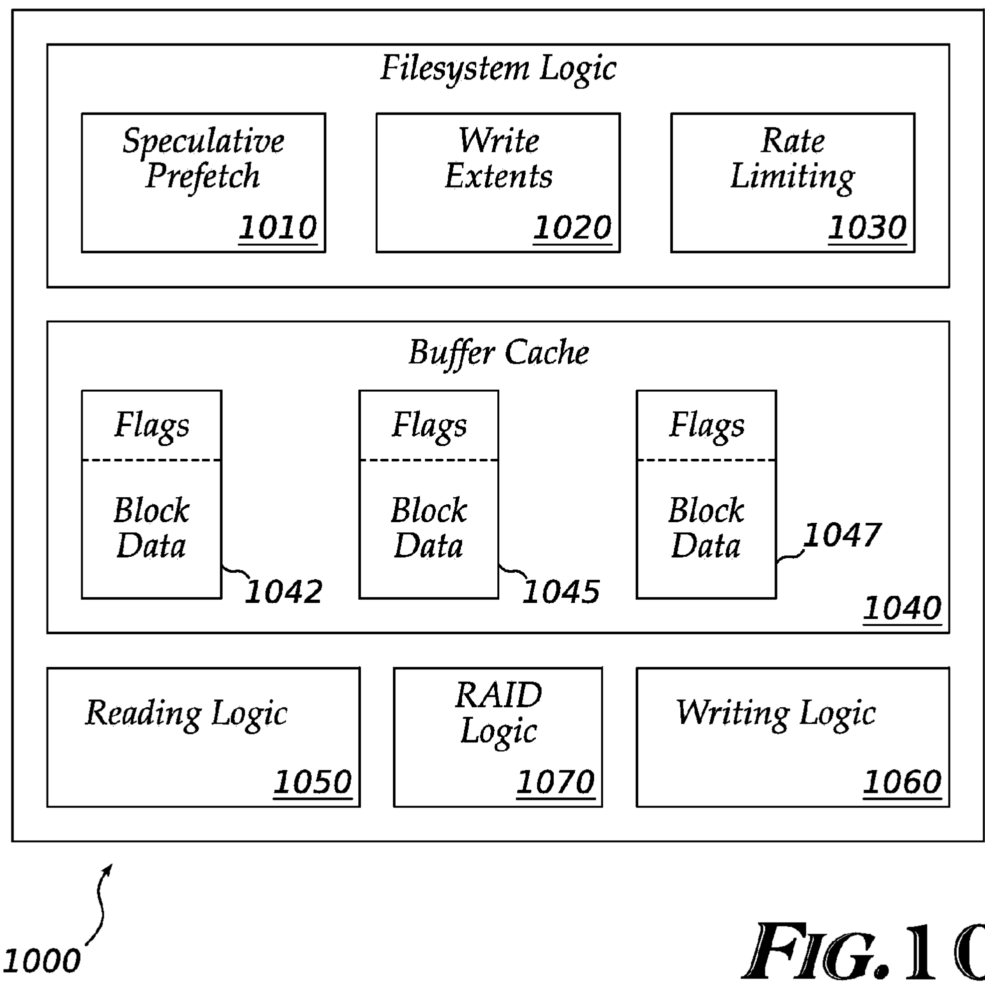
FIG. 10 shows one way of breaking up the operations of an embodiment of the invention into functional modules.

FIG. 10 shows some logic modules that can be identified in some embodiments. Software 1000 to control and operate a storage server contains filesystem logic including a speculative prefetch module 1010 to predict which data blocks will be needed from a mass storage subsystem (not shown), a write extents module 1020 to identify unmodified data blocks of a data object that are logically near a modified data block of the object, and rate limiting logic 1030 to restrict the workload imposed by the read and write operations of the speculative prefetch and write extents modules. Reading logic 1050 and writing logic 1060, possibly in conjunction with RAID logic 1070, control reading and writing data from a mass storage subsystem (not shown). Data blocks obtained by the reading logic 1050, and data blocks to be written by the writing logic 1060, are stored in buffer cache 1040 (see example data blocks 1042, 1045 and 1047). Each cached data block may be associated with flags and other information to indicate where the block came from, where it is to be stored, how long it has been in the cache, and so on. Software to control an enterprise-class storage server would, of course, have many other modules and subsystems as well.

An embodiment of the invention may be a machine-readable medium having stored thereon data and instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), flash memory, and any of various forms of Erasable Programmable Read-Only Memory (EPROM).

The applications of the present invention have been described largely by reference to specific examples and in terms of particular allocations of functionality to certain hardware and/or software components. However, those of skill in the art will recognize that rate-limited storage layout optimization can also be achieved by software and hardware that distribute the functions of embodiments of this invention differently than herein described. Such variations and implementations are understood to be captured according to the following claims.

I claim:

1. A method comprising:

identifying, by a filesystem process in a data storage server, a first plurality of optimizable data blocks during a read operation on a related data block;

identifying, by the filesystem process, a second plurality of optimizable data blocks during a write operation on a related data block;

posting, by the filesystem process, a plurality of read requests to a queue, the read requests prepared by the filesystem process to read a third plurality of data blocks into a cache memory from a mass storage device, the third plurality of data blocks comprising a subset of the first plurality of optimizable data blocks identified during the read operation and a subset of the second plurality of optimizable data blocks identified during the write operation;

retrieving, by a reading process in the data storage server, a read request from the queue;

delivering, by the reading process, data blocks corresponding to the retrieved read request to the cache memory; and writing, by a writing process in the data storage server, a fourth plurality of data blocks to a mass storage device as a result of a cache flush, the fourth plurality of data blocks comprising a subset of the third plurality of data blocks that had been delivered to the cache memory prior to the cache flush, wherein if fewer than all of the second plurality of data blocks have been delivered to the cache memory before the cache flush, then the fourth plurality of data blocks does not include any of the second plurality of data blocks.

2. The method of claim 1 wherein the read process is a speculative prefetch process.

3. The method of claim 1 wherein the write process is a write extents process.

4. The method of claim 1 wherein posting the read requests to the queue is asynchronous with delivering the data blocks corresponding to read requests retrieved from the queue.

5. The method of claim 1, further comprising:

limiting a number of read requests posted to the queue to a predetermined maximum.

6. The method of claim 1, further comprising:

deferring a read request if posting the read request to the queue memory would exceed a hardware input/output limit of the mass storage device.

7. The method of claim 1, further comprising:

discarding a read request if the read request occurs after the writing operation.

8. The method of claim 1 wherein writing the fourth plurality of data blocks comprises:

writing at least two data blocks of the fourth plurality of data blocks in contiguous locations of the mass storage device.

9. The method of claim 1, further comprising:

determining, by the reading process, whether a timestamp associated with the retrieved read request is valid; and discarding the retrieved read request if the timestamp associated with the retrieved read request is not valid.

10. A non-transitory computer-readable medium having executable instructions to cause a processor to perform operations comprising:

identifying, by a filesystem process in a data storage server, a first plurality of optimizable data blocks during a read operation on a related data block;

identifying, by the filesystem process, a second plurality of optimizable data blocks during a write operation on a related data block;

posting, by the filesystem process, a plurality of read requests to a queue, the read requests prepared by the filesystem process to read a third plurality of data blocks into a cache memory from a mass storage device, the third plurality of data blocks comprising a subset of the first plurality of optimizable data blocks and a subset of the second plurality of optimizable data blocks identified during the write operation;

retrieving, by a reading process in the data storage server, a read request from the queue;

delivering, by the reading process, data blocks corresponding to the retrieved read request to the cache memory; and writing, by a writing process in the data storage server, a fourth plurality of data blocks to the mass storage device as a result of a cache flush, the fourth plurality of data blocks comprising a subset of the third plurality of data blocks that had been delivered to the cache memory prior to the cache flush, wherein if fewer than all of the second plurality of data blocks have been delivered to the cache memory before the cache flush, then the fourth plurality of data blocks does not include any of the second plurality of data blocks.

11. The non-transitory computer readable medium of claim 10, wherein the read process is a speculative prefetch process.

12. The non-transitory computer readable medium of claim 10, wherein the write process is a write extents process.

13. The non-transitory computer readable medium of claim 10, wherein posting the read requests to the queue is asynchronous with delivering the data blocks corresponding to read requests retrieved from the queue.

14. The non-transitory computer readable medium of claim 10, wherein the executable instructions cause the processor to perform operations further comprising;

limiting a number of read requests posted to the queue to a predetermined maximum.

15. The non-transitory computer readable medium of claim 10, wherein the executable instructions cause the processor to perform operations further comprising:

deferring a read request if posting the read request to the queue memory would exceed a hardware input, output limit of the mass storage device.

16. The non-transitory computer readable medium of claim 10, wherein the executable instructions cause the processor to perform operations further comprising:

discarding a read request if the read request occurs after the writing operation.

17. The non-transitory computer readable medium of claim 10 wherein writing the fourth plurality of data blocks comprises:

writing at least two data blocks of the fourth plurality of data blocks in contiguous locations of the mass storage device.

18. A system comprising:

a data storage server comprising a cache memory, the data storage server operative to:

identify, by a filesystem process in the data storage server, a first plurality of optimizable data blocks during a read operation on a related data block;

identify, by the filesystem process, a second plurality of optimizable data blocks during a write operation on a related data block;

post, by the filesystem process, a plurality of read requests to a queue, the read requests prepared by the filesystem process to read a third plurality of data blocks into a cache memory from a mass storage device, the third plurality of data blocks comprising a subset of the first plurality of optimizable data blocks identified during the read operation and a subset of the second plurality of optimizable data blocks identified during the write operation;

retrieve, by a reading process in the data storage server, a read request from the queue;

deliver, by the reading process, data blocks corresponding to the retrieved read request to the cache memory; and write, by a writing process in the data storage server, a fourth plurality of data blocks to a mass storage device as a result of a cache flush, the fourth plurality of data blocks comprising a subset of the third plurality of data blocks that had been delivered to the cache memory prior to the cache flush, wherein if fewer than all of the second plurality of data blocks have been delivered to the cache memory before the cache flush, then the fourth plurality of data blocks does not include any of the second plurality of data blocks.

19. The system of claim 18, further comprising:

a mass storage system, wherein the cache memory is to hold clean data blocks loaded from the mass storage subsystem, dirty data blocks to be written on the mass storage system, and fake-dirty data blocks to be written on the mass storage subsystem, wherein a fake-dirty block contains data identical to data stored at a first location of the mass storage system, and the fake dirty block is to be stored at a second location of the mass storage subsystem.

20. A method, comprising:

identifying, by a data storage server, in response to receiving a read request for a first block, a first set of optimizable data blocks logically related to the first block;

identifying, by the data storage server, in response to receiving a write request for a second block, a second set of optimizable data blocks logically related to the second block;

loading a third set of blocks from a mass storage device into a cache memory, wherein the third set of blocks comprises a subset of the first set of optimizable data blocks and a subset of the second set of optimizable data blocks; and writing a plurality of data blocks to the mass storage device as a result of a cache flush, wherein the plurality of data blocks comprise a subset of the third set of blocks, and wherein the plurality of blocks does not include any of the second set of optimizable data blocks unless all of the second set of optimizable data blocks have been loaded into the cache memory at the time of the cache flush.

21. The method of claim 20, wherein:

the third set of blocks includes at least one of the second set of optimizable data blocks but not all of the second set of optimizable data blocks; and the plurality of blocks includes the second block and none of the second set of optimizable data blocks.

22. The method of claim 20, wherein the read request for the first block and the write request for the second block are not made by a defragmentation process.

* * * * *